(12) United States Patent
Schroeder

(10) Patent No.: US 9,762,038 B2
(45) Date of Patent: Sep. 12, 2017

(54) INDEPENDENT SHUTTER SYSTEM FOR RACK-IN BREAKERS

(71) Applicant: SCHNEIDER ELECTRIC USA, INC., Palatine, IL (US)

(72) Inventor: David Schroeder, Marion, IA (US)

(73) Assignee: Schneider Electric USA, Inc., Andover, MA (US)

( * ) Notice: Subject to any disclaimer, the term of this patent is extended or adjusted under 35 U.S.C. 154(b) by 202 days.

(21) Appl. No.: 14/774,841

(22) PCT Filed: Mar. 14, 2013

(86) PCT No.: PCT/US2013/031345
§ 371 (c)(1),
(2) Date: Sep. 11, 2015

(87) PCT Pub. No.: WO2014/142875
PCT Pub. Date: Sep. 18, 2014

(65) Prior Publication Data
US 2016/0036204 A1    Feb. 4, 2016

(51) Int. Cl.
*H02B 11/24* (2006.01)
*H02B 11/133* (2006.01)

(52) U.S. Cl.
CPC .......... *H02B 11/24* (2013.01); *H02B 11/133* (2013.01)

(58) Field of Classification Search
None
See application file for complete search history.

(56) References Cited

U.S. PATENT DOCUMENTS

| 3,121,144 | A |   | 2/1964 | Tjebben |           |
|-----------|---|---|--------|---------|-----------|
| 3,610,850 | A |   | 10/1971 | Eichelberger |     |
| 4,565,908 | A | * | 1/1986 | Bould ..................... | H02B 11/24 |
|           |   |   |        |         | 200/50.22 |
| 5,343,355 | A | * | 8/1994 | Ishikawa ................ | H02B 11/24 |
|           |   |   |        |         | 200/304   |

(Continued)

OTHER PUBLICATIONS

International Search Report and Written Opinion mailed Jun. 3, 2013 in International Application No. PCT/US13/31345, 11 pages.

(Continued)

*Primary Examiner* — Courtney Smith
(74) *Attorney, Agent, or Firm* — Locke Lord LLP

(57) ABSTRACT

A switchgear interlock system includes a circuit breaker with clusters of connector fingers separated from each other by respective cluster shields. In a connected position, the connector fingers engage respective bus connectors of bus bars for electrical contact. When the circuit breaker is disconnected from the bus bars, independently movable shutters cover access to the bus connectors to prevent inadvertent contact with the bus connectors. Each shutter includes a pedestal with an attached movable mount and movable curtain. As the circuit breaker is moved into the connected position, the mount slides along the pedestal towards the bus connector causing the curtain to open and allow the connector fingers to engage the bus connectors. As the circuit breaker is being disconnected, a return spring causes the mount to slide along the pedestal away from the bus connectors causing the curtain to close and prevent access to the bus connectors.

18 Claims, 21 Drawing Sheets

(56) References Cited

U.S. PATENT DOCUMENTS

| | | | |
|---|---|---|---|
| 7,646,271 B2* | 1/2010 | Gottschalk | H01H 9/0264 |
| | | | 200/50.32 |
| 9,312,668 B2* | 4/2016 | Faber | H01H 9/22 |
| 2005/0258922 A1 | 11/2005 | Rowe et al. | |
| 2008/0023211 A1 | 1/2008 | Yee et al. | |
| 2009/0000926 A1 | 1/2009 | Buxton et al. | |
| 2012/0228095 A1 | 9/2012 | Kutsche et al. | |
| 2015/0372461 A1* | 12/2015 | Romero Legorreta | H01B 17/42 |
| | | | 361/612 |

OTHER PUBLICATIONS

Extended European Search Report for European Patent Application No. 13878040.8, Dated Oct. 12, 2016, 7 pages.

* cited by examiner

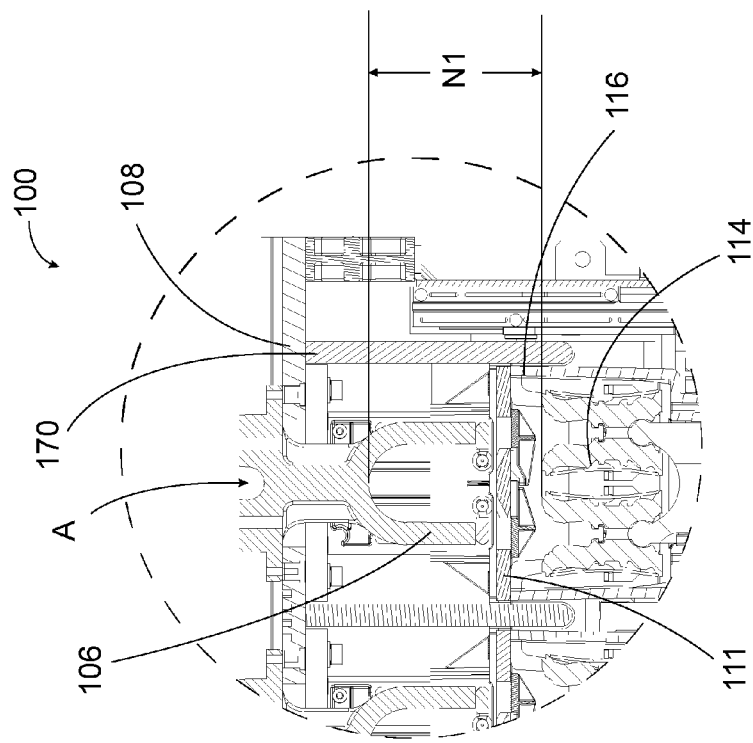
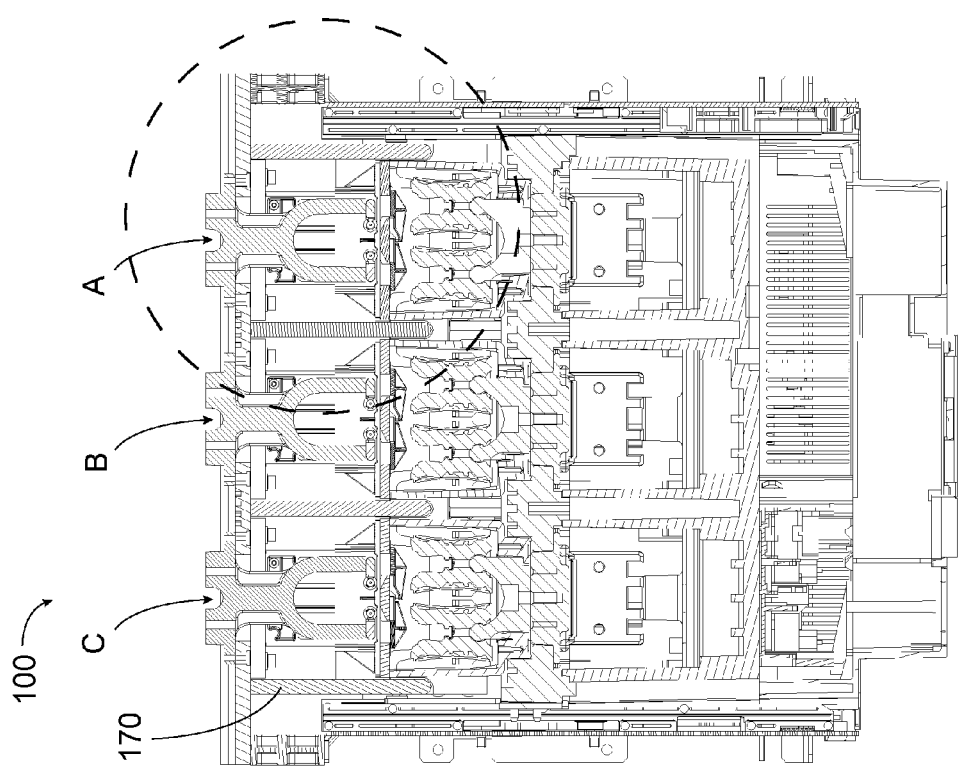
FIG. 11B
FIG. 11A

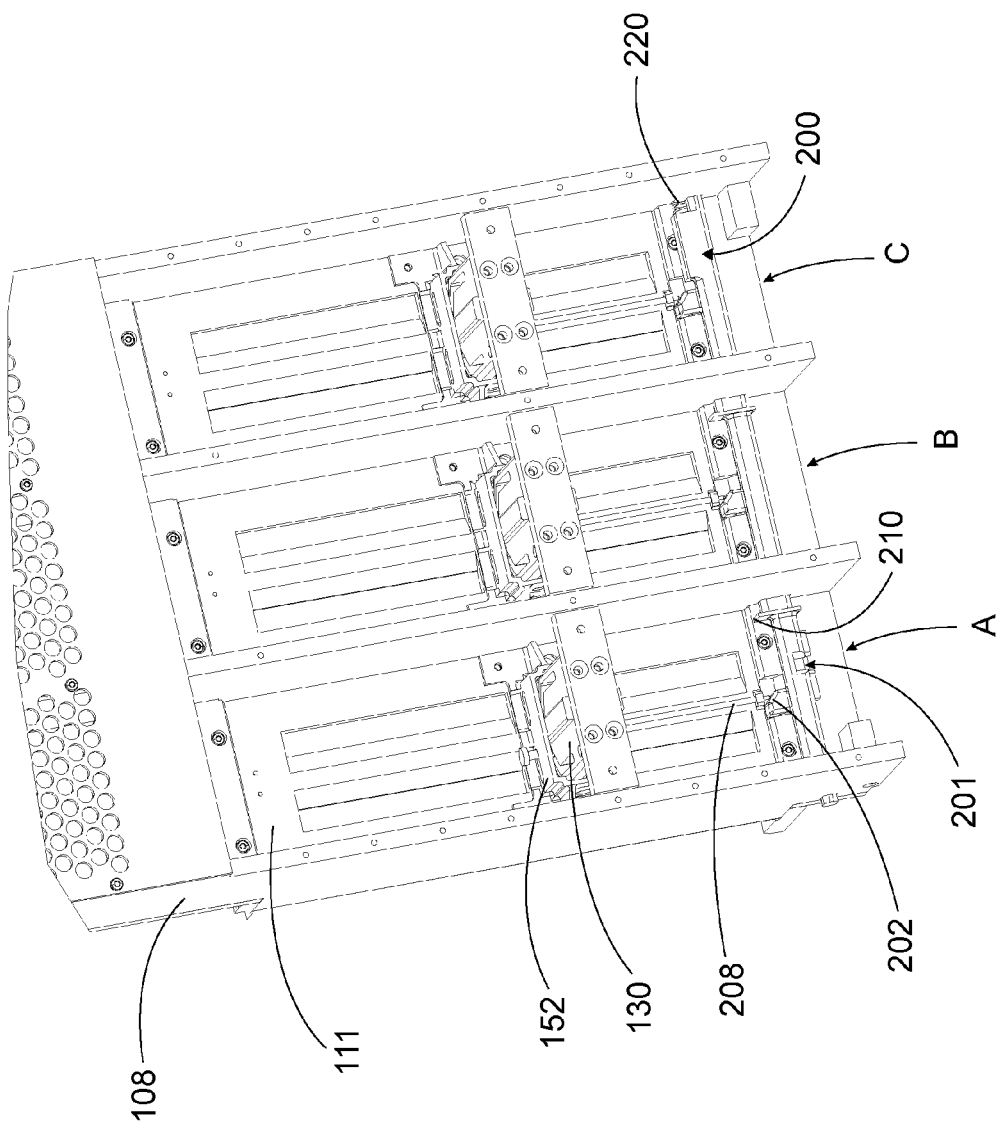

INDEPENDENT SHUTTER SYSTEM FOR RACK-IN BREAKERS

FIELD OF THE INVENTION

This invention is directed generally to electrical systems, and, more particularly, to a switchgear system with independently movable shutters for protecting bus connectors.

BACKGROUND OF THE INVENTION

Circuit breakers used in switchgear systems are often built with a draw-out configuration, which allows breaker insertion or removal in a cradle assembly without disturbing power circuit connections. The draw-out breakers have a connected position in which connector fingers of the breakers are connected to respective bus connectors of bus bars, and a test position in which the connector fingers are disconnected from the bus connectors. To cover access to, and prevent inadvertent contact with, the bus connectors when the breaker is in the test position, a common shutter system has been presently utilized across a back plane of the cradle assembly. The shutter system includes sliding panels that protect all breaker phases at the same time. The shutter system further requires additional space that reduces mounting space for other switchgear components, e.g., arc-flash components, structural walls, etc. As such, the present shutter system restricts the amount of space available between the phases and does not allow installation of additional switchgear components.

SUMMARY OF THE INVENTION

In an implementation of the present invention, a switchgear interlock system is directed to a shutter assembly with independent shutters for covering access to bus connectors, which are attached to a back-mold. Each shutter includes a curtain having left and right hands that are slidably mounted to a curtain mount, which, in turn, is slidably mounted to a mount pedestal. The mount pedestal is mounted to the back-mold. The system further includes a circuit breaker with clusters of connector fingers that are connected to respective ones of the bus connectors. Each cluster of connector fingers is enclosed in part within a cluster shield. As the circuit breaker is moved from a test position, in which the shutters are closed, into a connected position, in which the shutters are open, a leading edge of each cluster shield presses on a respective curtain mount moving it backwards towards the back-mold. In response, the respective mount pedestal presses against a respective curtain causing the left and right hands to move away from each other, thereby opening the curtain. With the curtain open, the connector fingers are pressed in contact with the bus connectors.

The switchgear interlock system optionally includes a crossbar with locking and positional indicator features that allow a user to lock or unlock the shutters with a single input. The locking feature is a safety feature that prevents inadvertent insertion or removal of the circuit breaker, and/or inadvertent contact with the bus connectors when the circuit breaker is removed. When the circuit breaker is connected (in the connected position), the crossbar prevents the curtain of each shutter from closing. Vice-versa, when the circuit breaker is disconnected (in the test position) the crossbar prevents the curtain of each shutter from opening. Positional indicators provide a visual indicator for the user to quickly determine the breaker position. Additionally, the crossbar includes dielectric barriers to help isolate each pole and stop cross-phasing during interruption.

In another implementation of the present invention, a switchgear interlock system includes a circuit breaker with clusters of connector fingers, each of the clusters having a plurality of connector fingers enclosed in part within a cluster shield. The system also includes a back-mold with attached bus connectors, the bus connectors being engaged with respective connector fingers when the circuit breaker is in a connected position. The bus connectors are disengaged from the respective connector fingers when the circuit breaker is in a test position. The system further includes a shutter assembly with independently movable shutters for covering access to the bus connectors in the test position (e.g., when the circuit breaker is removed) and allowing access to the bus connectors in the connected position. Each shutter of the movable shutters includes a pedestal, a mount, and a curtain. The pedestal is fixedly mounted to the back-mold. The mount is mounted to the pedestal and is movable towards the back-mold in response to a force applied by a leading edge of the cluster shield when the circuit breaker is moved into the connected position. The curtain is mounted to the mount and is movable from a closed position to an open position in response to a force applied by the pedestal as the mount moves towards the back-mold. The closed position corresponds to the test position and/or the disconnected position of the circuit breaker in which access is prevented to the bus connectors. The open position corresponds to the connected position of the circuit breaker in which access is allowed to the bus connectors.

In another alternative implementation of the present invention, a switchgear interlock system includes a circuit breaker with a cluster shield extending rearwardly and a back-mold with attached bus connectors. At least two independently movable shutters are mounted on the back-mold parallel to each other, each of the shutters including a pedestal fixedly mounted to the back-mold. Each shutter further includes a mount movably attached to the pedestal, and a curtain attached to the mount. The curtain has two slidable hands movable between an open position and a closed position. The hands are movable away from each other from the closed position to the open position in response to the mount being forced towards the back-mold along the pedestal. The hands are movable towards each other from the open position to the closed position in response to a return force applied by a spring. The system further includes a crossbar movable between a locked state and an unlocked state in response to a single user input. The locked state prevents movement of the hands in the closed position for each of the shutters.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The invention may best be understood by reference to the following description taken in conjunction with the accompanying drawings.

FIG. 11A is a cross-sectional view along lines 11A-11A in FIG. 10.

FIG. 11B is an enlarged portion of FIG. 11A.

FIG. 19 is a back perspective view of the shutter system of FIG. 17 with the crossbar in the unlocked state.

DETAILED DESCRIPTION OF THE ILLUSTRATED EMBODIMENTS

Figure 1:
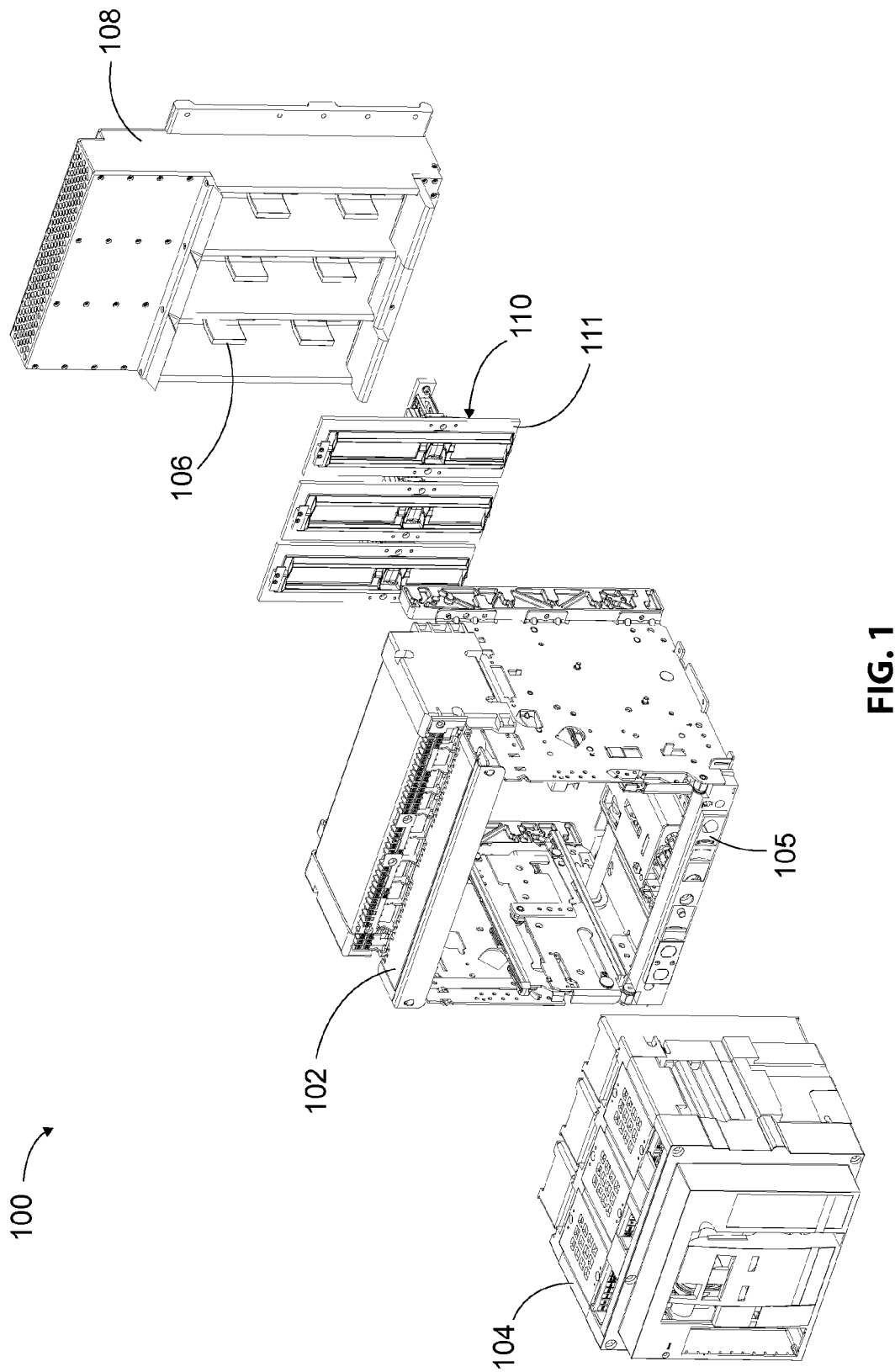
FIG. 1 is a front exploded view of a switchgear system.

Referring to FIG. 1, a switchgear system 100 is typically installed in a switchgear cabinet (not shown) along with other electrical equipment for distributing, controlling, and/or protecting electrical equipment. The switchgear system 100 includes a chassis 102 for receiving a draw-out circuit breaker 104, which is movable in and out of contact with an electrical supply. The electrical supply is received via one or more bus bars (not shown) having bus connectors, collectively 106, that extend towards the circuit breaker 104 from a back-mold 108. To protect inadvertent contact with the bus connectors 106 when the circuit breaker 104 is in a test position or in a disconnected position (i.e., when the circuit breaker 104 is disconnected from the electrical supply), an independent shutter assembly 110 is attached to the back-mold 108. The chassis 102 includes a front surface 105 that has a recessed area in which an indicator 310 (shown in FIG. 23) is positioned.

The shutter assembly 110 includes three independent shutters 111a-111c (collectively and representatively referred to as shutter 111), one for each phase, for covering access to the bus connectors 106 in the test position of the circuit breaker 104. When the circuit breaker 104 is in a connected position, and as discussed in more detail in reference to FIGS. 3-13, the shutters 111 independently of each other allow access to the bus connectors 106.

Figure 2:
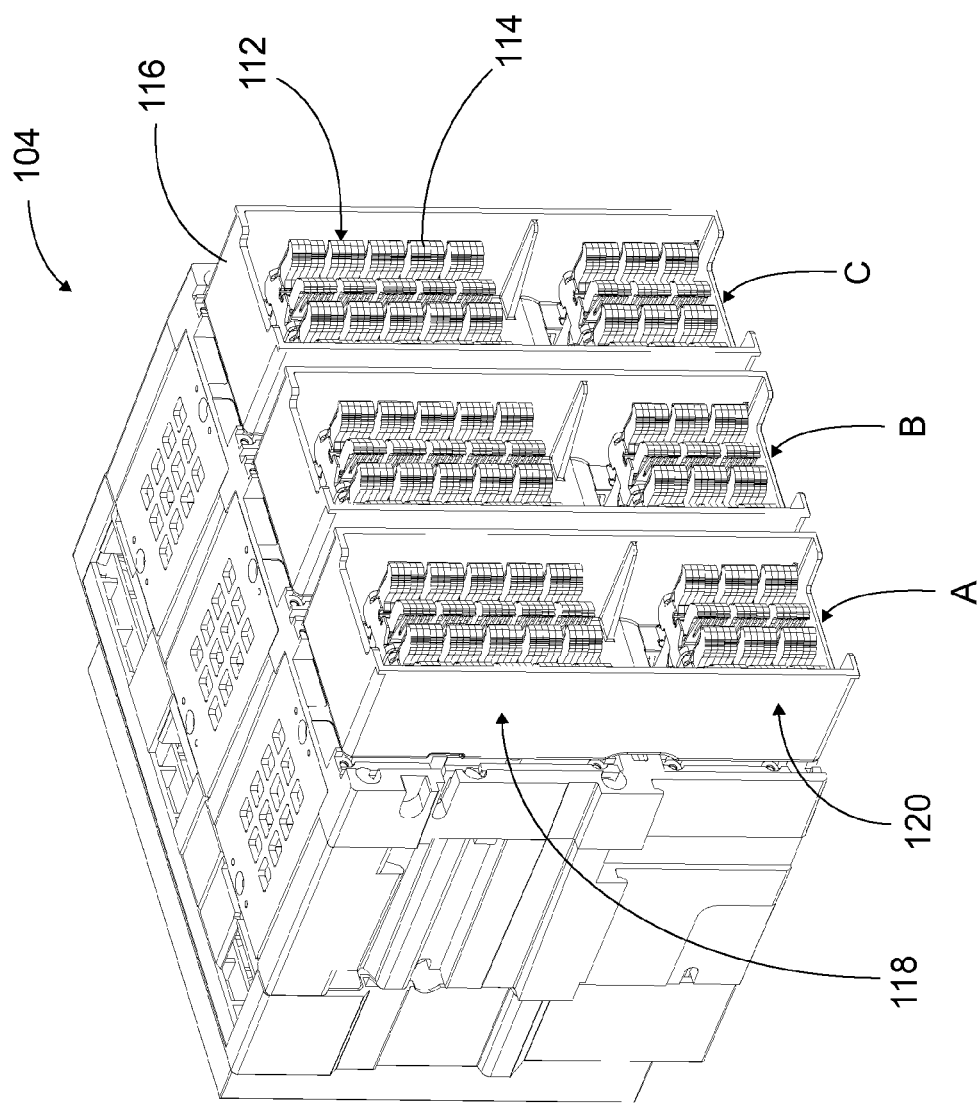
FIG. 2 is a back view of a draw-out circuit breaker.

Referring to FIG. 2, the circuit breaker 104 includes clusters 112 of connector fingers 114 enclosed in part in respective cluster shields 116. The clusters 112 are the connecting apparatus fitted to the circuit breaker 104 for attaching it to phases of electrical power (here shown as three phases A, B, C) received via the bus connectors 106. The phases are separated in columns, with line and load connections of the circuit breaker 104 being arranged in rows 118, 120. In other examples, the system 100 can have four, six, or eight phases.

Each phase has a dedicated cluster shield 116 that is mounted around a respective cluster 112. The cluster shield 116 is essentially a parallelepiped with four sides or faces forming a box around the cluster 112, which includes both line and load connections. The cluster shield 116 further has an open face to permit the bus connectors 106 to engage with respective connector fingers 114 when the circuit breaker 104 is in a connected position.

Figure 3:
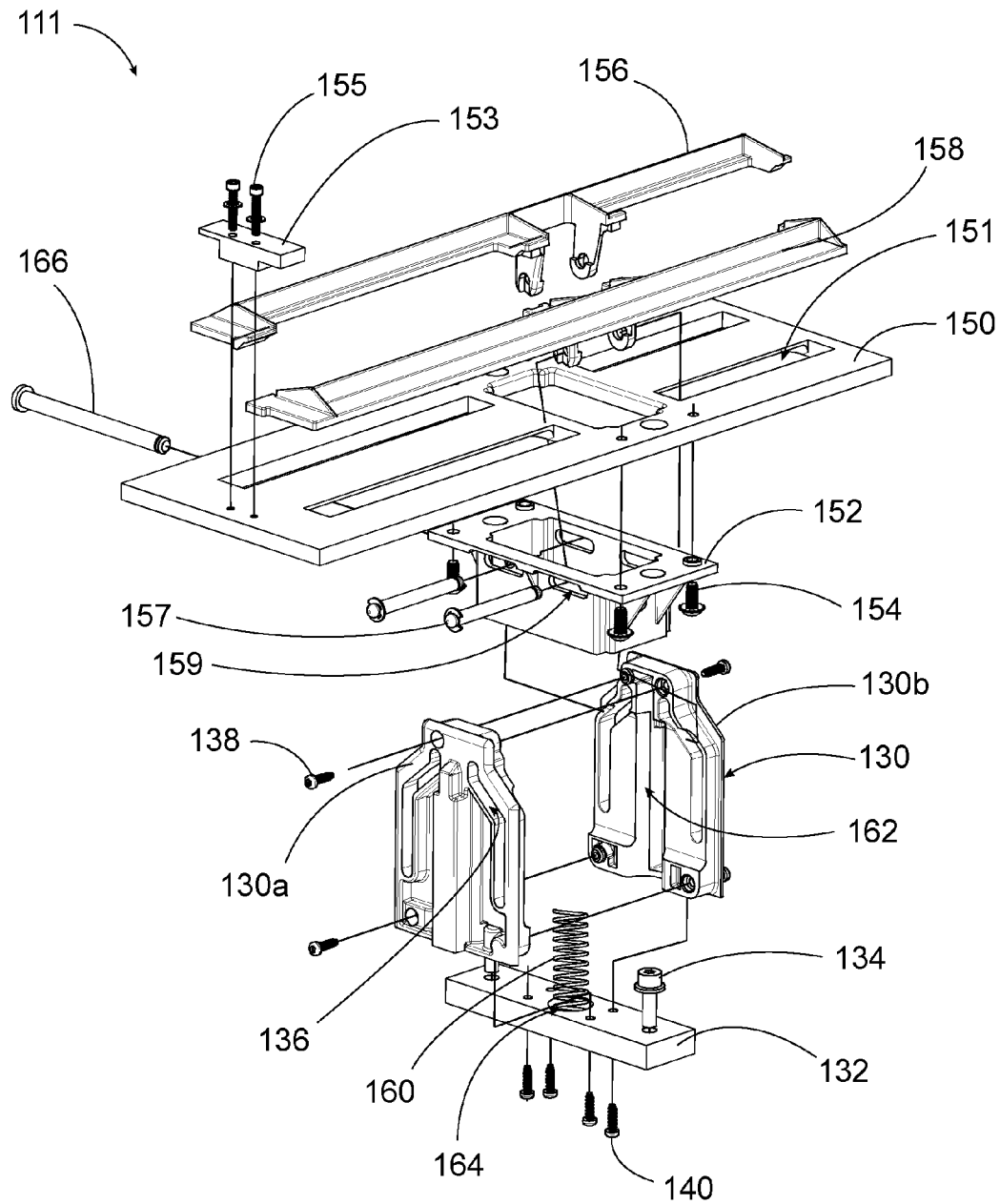
FIG. 3 is an exploded view of an independent shutter assembly.
Figure 5:
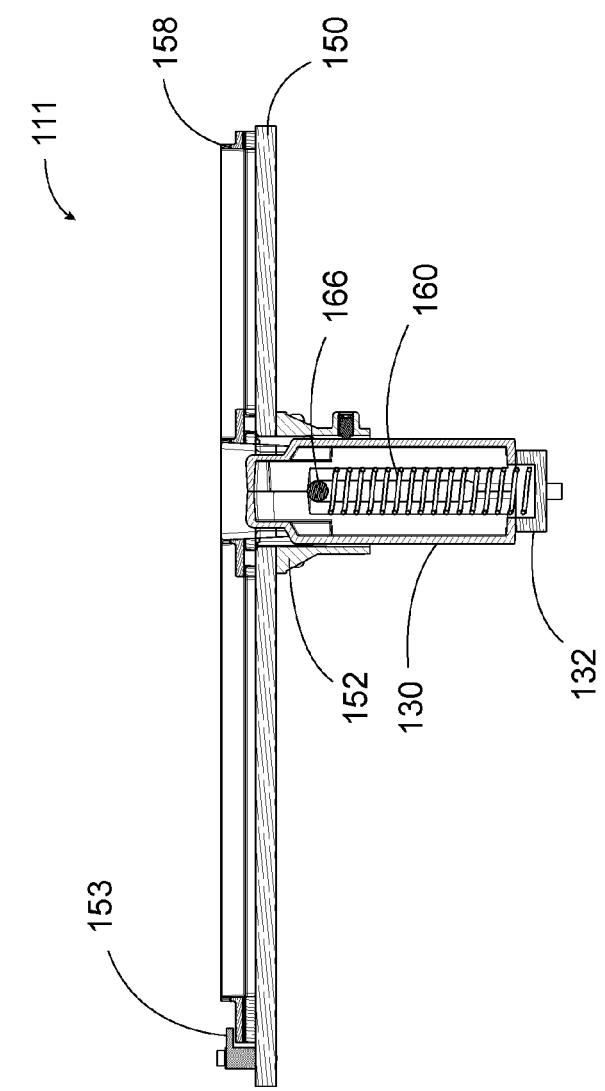
FIG. 5 is a cross-sectional view of FIG. 4.
Figure 4:
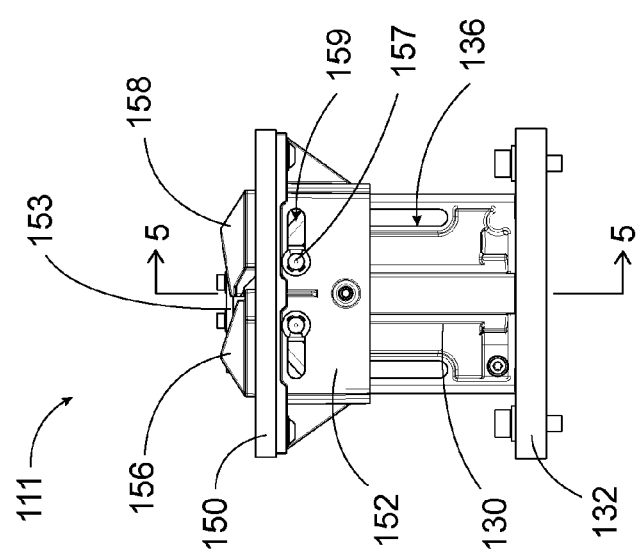
FIG. 4 is a side assembled view of the assembly of FIG. 3.

Referring to FIGS. 3-5, a representative shutter 111 of the three shutters 111a-111c includes a pedestal 130 that is fixedly mounted to the back-mold 108 near a pedestal base 132 via a pair of fasteners 134. The pedestal 130 includes a main body with two mating components 130a, 130b, each having two cam profiles 136. The mating components are fastened to each other and to the pedestal base 132 via respective fasteners 138, 140.

The shutter 111 further includes a curtain 150 fixedly mounted to a mount 152, via fasteners 154, and having movably mounted left and right hands 156, 158. The curtain 150 includes a plurality of apertures 151 through which respective ones of the bus connectors 106 protrude when the circuit breaker 104 is in the connected position. The mount 152 is slidably mounted to the pedestal 130 and is movable towards the pedestal base 132 in response to a force applied by a leading edge of a respective cluster shield 116. A bracket 153 is attached, via fasteners 155, at one end of the curtain 150 to help guide motion of the left and right hands 156, 158 parallel to the curtain 150. Two guide pins 157 are positioned in receiving slots 159 and act to help guide movement of the mount 152 along elongated channels of the cam profiles 136.

The shutter 111 further includes a spring 160 mounted within an internal space 162 of the pedestal 130 and acting to apply a return force to the mount 152, when the circuit breaker 104 is disconnected, or is being disconnected. In other words, the spring 158 forces the curtain 150 and the mount 152 away from the pedestal base 132 when the cluster shield 116 is moved away from the curtain 150. The spring 158 includes a first end of that is received into a hole 164 of the pedestal base 132 and a second end that is attached to a spring pin 166.

Figure 6:
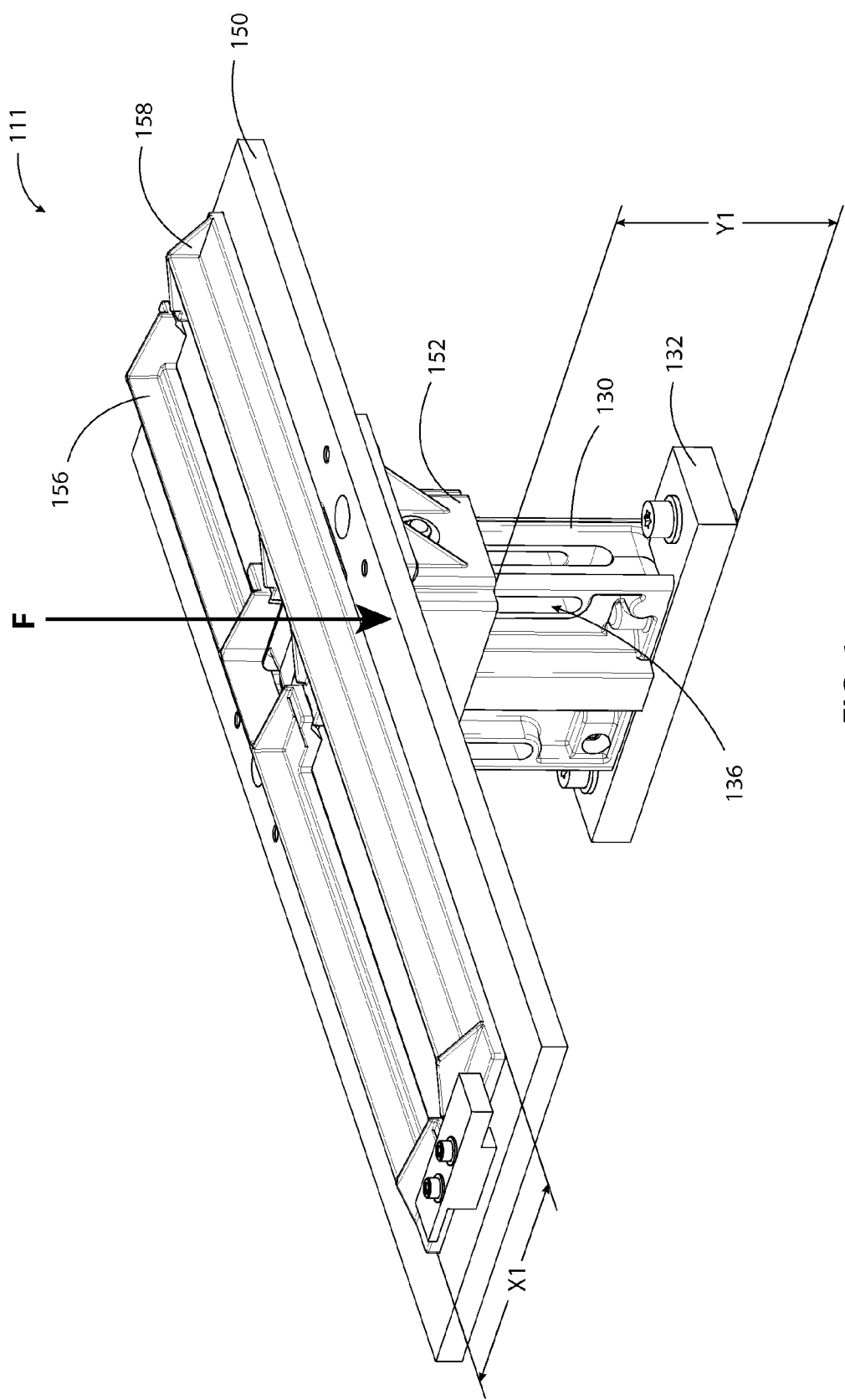
FIG. 6 is a top perspective view showing the assembly of FIG. 3 in a closed position.
Figure 7:
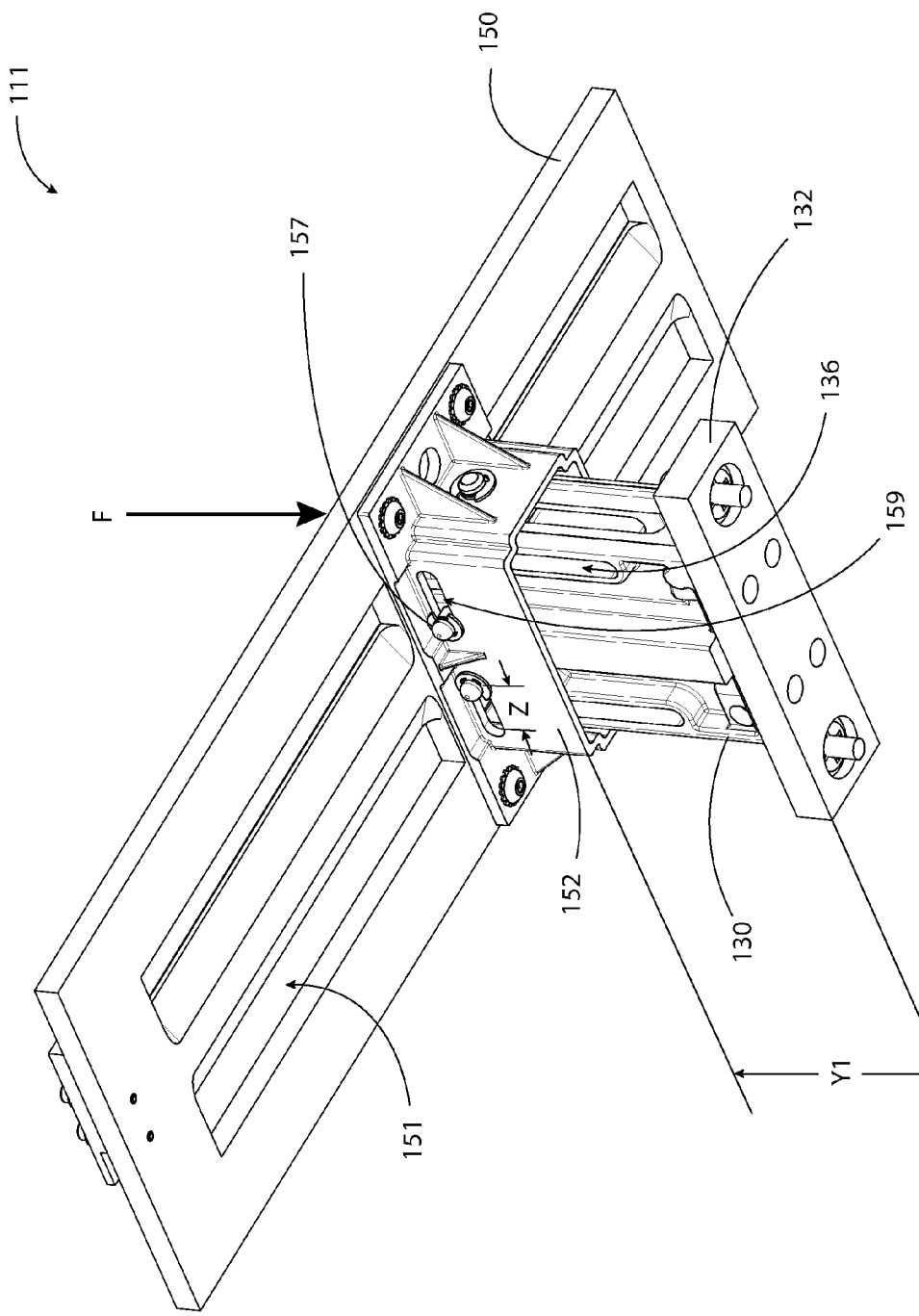
FIG. 7 is a bottom perspective view of the assembly of FIG. 6.
Figure 8:
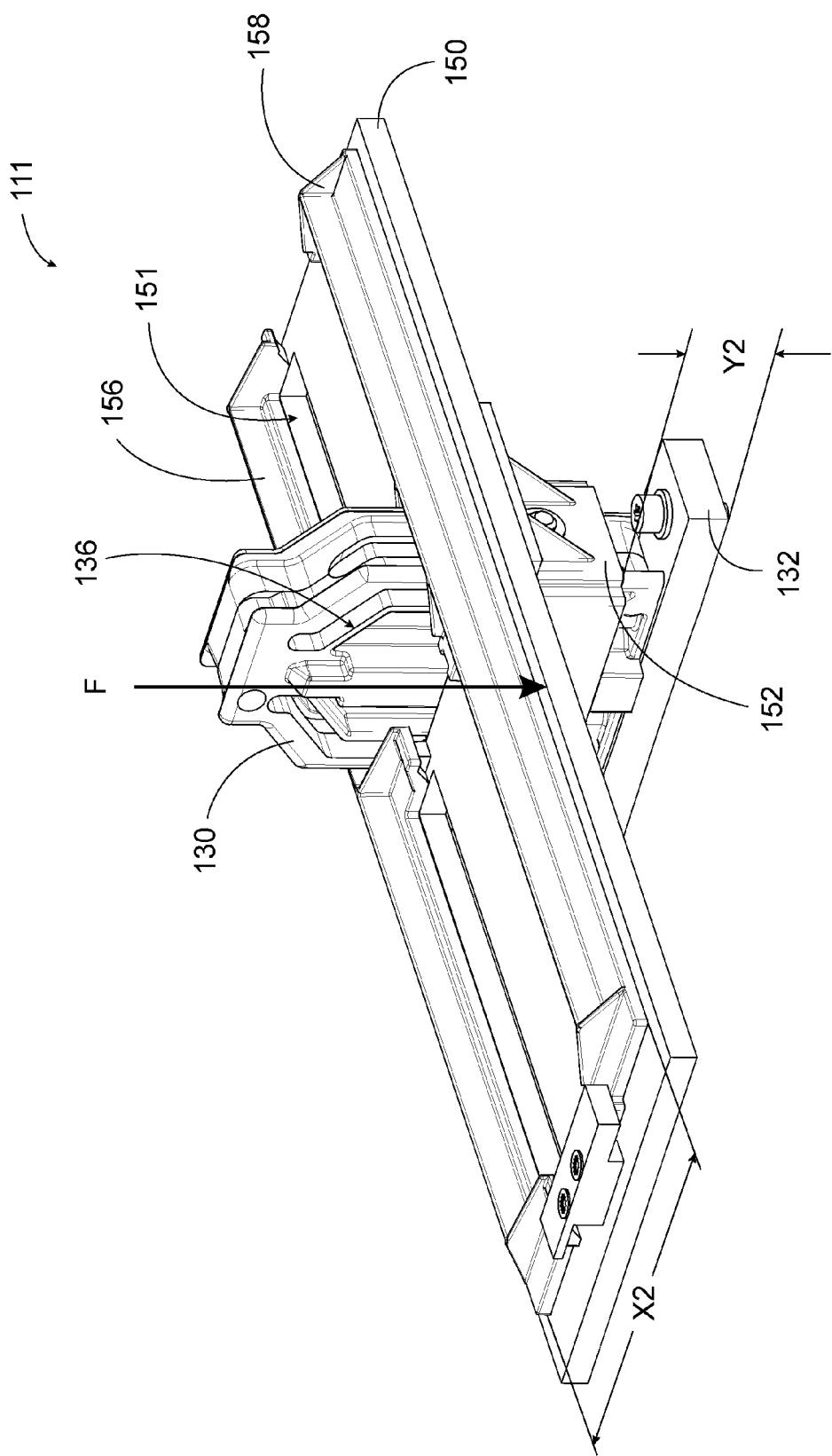
FIG. 8 is a top perspective view showing the assembly of FIG. 3 in an open position.
Figure 9:
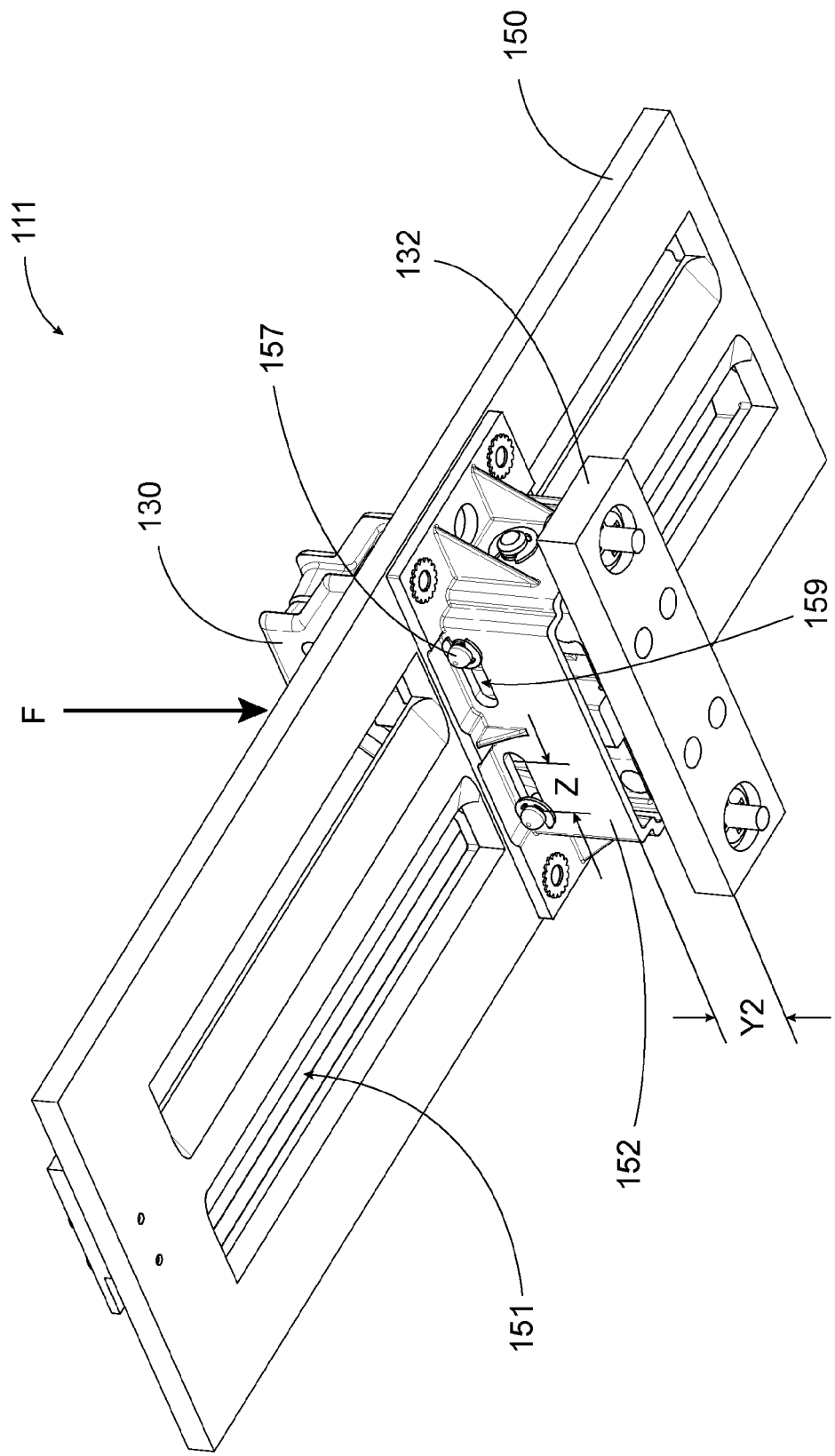
FIG. 9 is a bottom perspective view of the assembly of FIG. 8.

Referring to FIGS. 6-13B, the opening and closing motion of the shutter 111 will be described in more detail. FIGS. 6 and 7 show respective top and bottom perspective views of the shutter 111 in a closed position, which corresponds to the test position of the circuit breaker 104 shown in FIGS. 10-11B. FIGS. 8 and 9 show respective top and bottom perspective views of the shutter 111 in an open position, which corresponds to the connected position of the circuit breaker 104 sown in FIGS. 12-13A.

In the closed position, the left and right hands 156, 158 of the curtain 150 are in an inward location covering access to the apertures 151 (shown in FIGS. 6 and 7). As such, a distance X1 between outer edges of the left and right hands 156, 158 is at a minimum distance. The mount 152 is in the farthest location from the pedestal base 132, at a distance Y1. Furthermore, the connector fingers 114 are disengaged from the bus connectors 106 at a distance N1 from each other (shown in FIG. 11A), with a front surface of the circuit breaker 104 at a distance M1 from a front surface of the chassis 102 (shown in FIG. 11B).

In the open position, the left and right hands 156, 158 are in an outward location allowing access to the apertures 151 (shown in FIGS. 8 and 9). The distance X1 has changed to distance X2, which is a maximum distance between the outer edges of the left and right hands 156, 158. The mount 152 is in the closest location relative to the pedestal base 132, at a distance Y2. The connector fingers 114 are now engaged with the bus connectors 106 at a distance N2 from each other (shown in FIG. 13A), with the front surface of the circuit breaker 104 at a distance M2 from the front surface of the chassis 102 (shown in FIG. 13B). The distance M2 is smaller than distance M1, as the circuit breaker 104 has now been fully inserted into the chassis 102.

Figure 10:
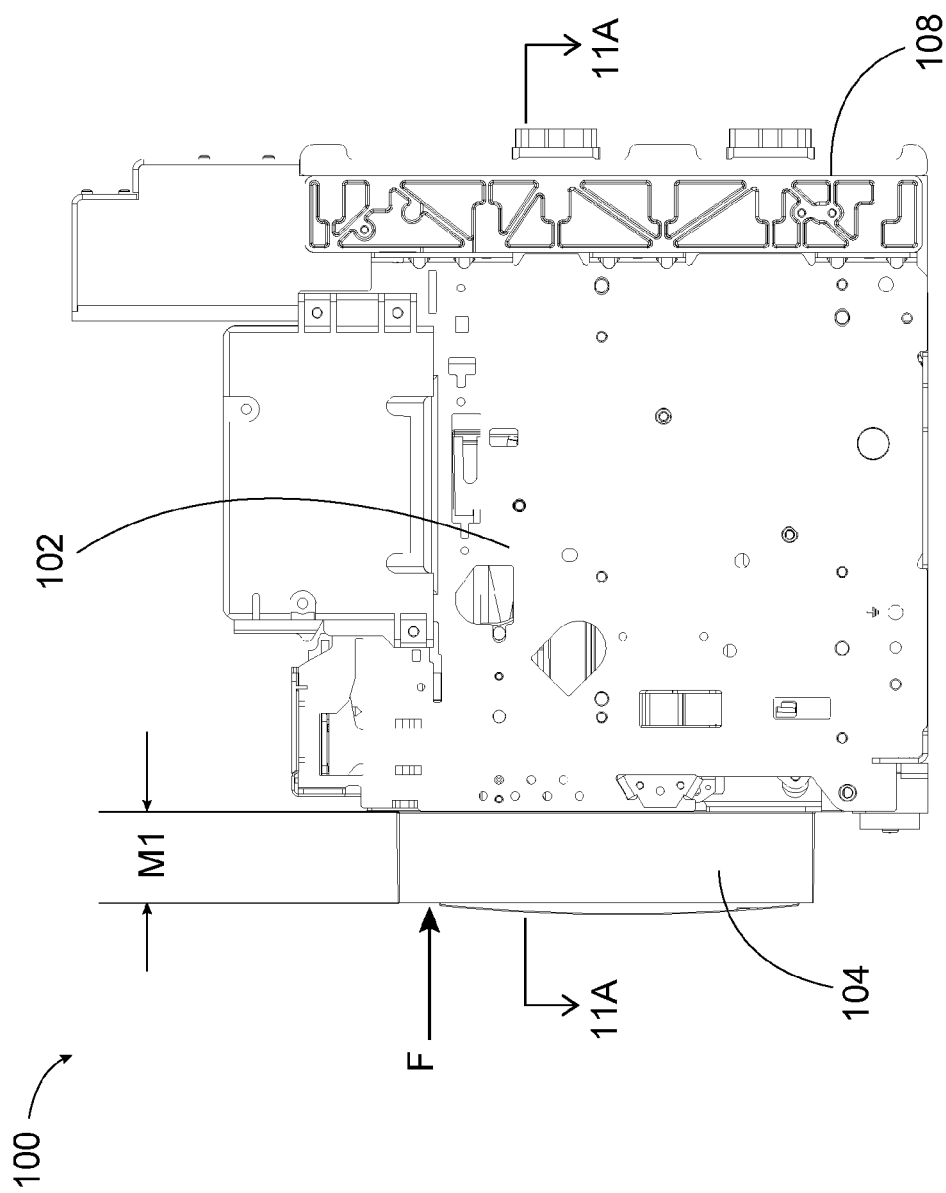
FIG. 10 is n assembled right side view of the system of FIG. 1 showing a circuit breaker in a test position.
Figure 12:
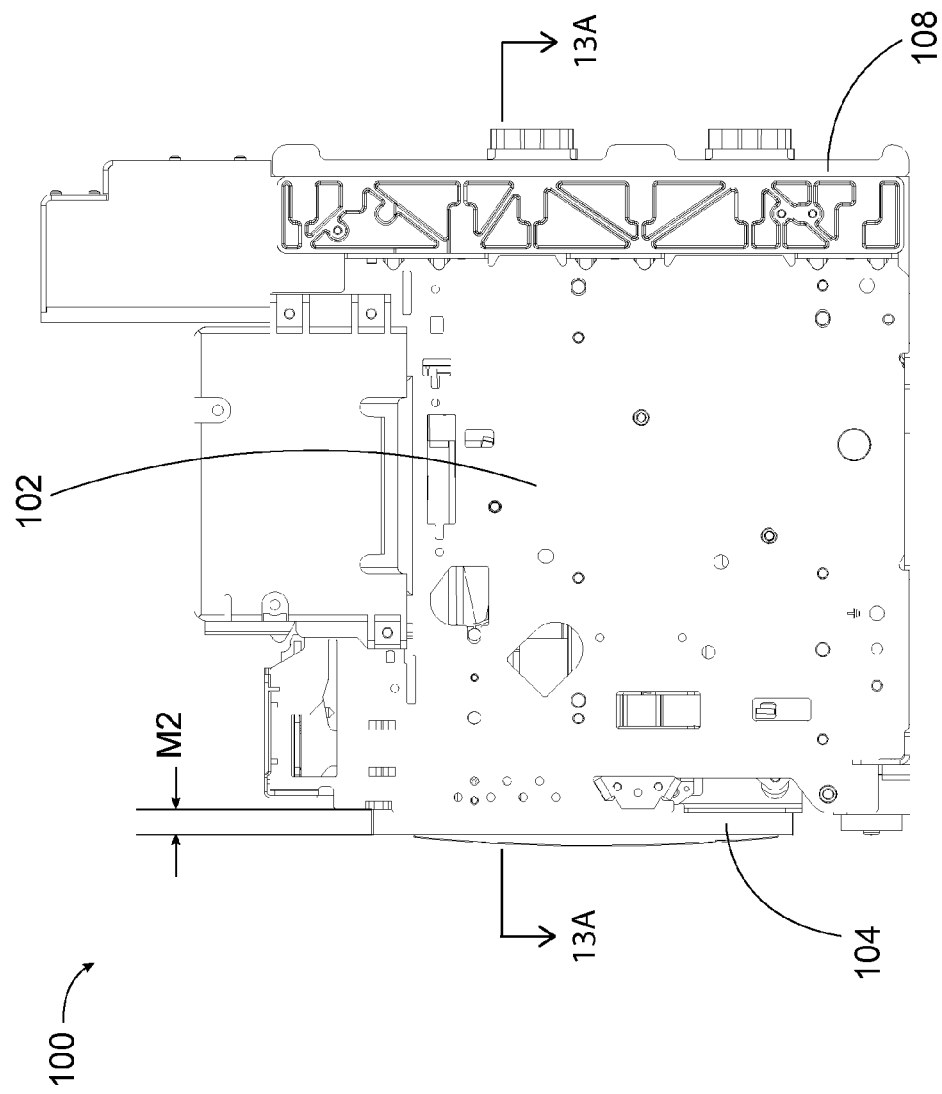
FIG. 12 is an assembled right side view of the system of FIG. 1 showing the circuit breaker in a connected position.
Figure 13B:
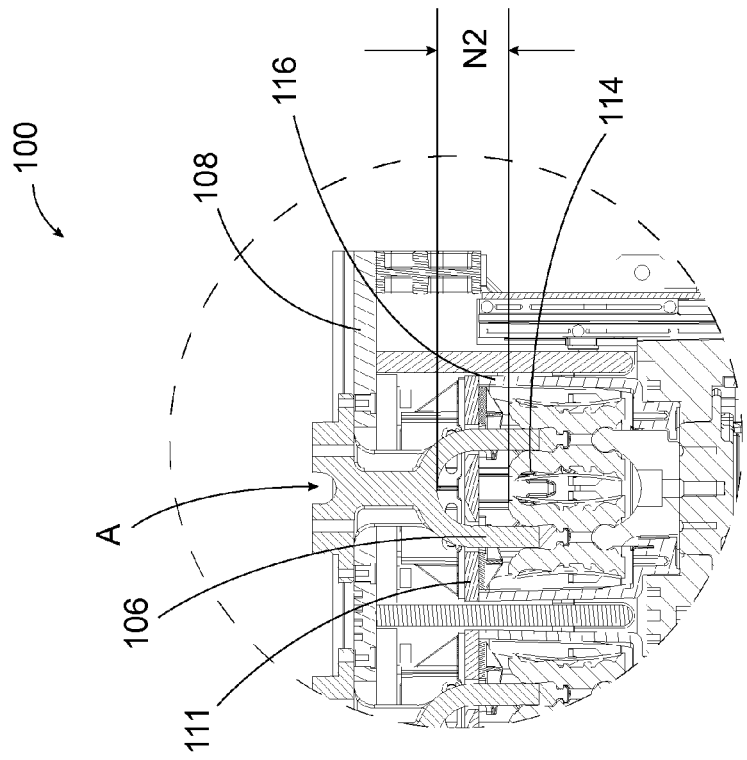
FIG. 13B is an enlarged portion of FIG. 13A.
Figure 13A:
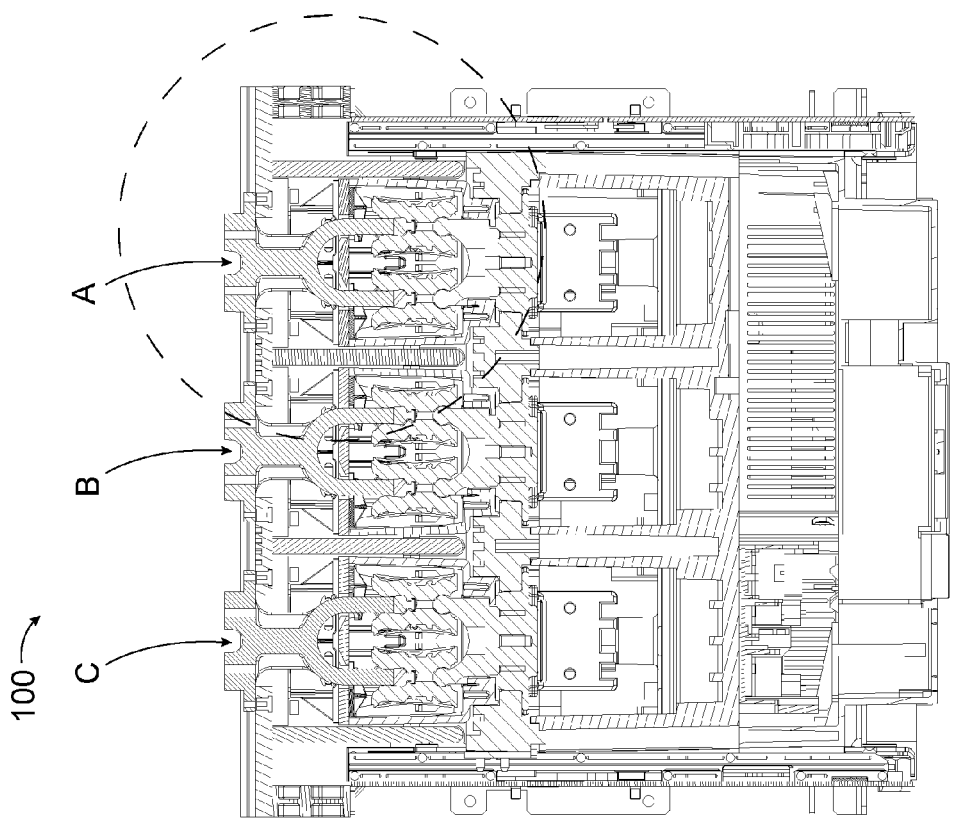
FIG. 13A is a cross-sectional view along lines 13A-13A in FIG. 12.

To move the shutter 111 from the closed to the open position, a force F is applied to the circuit breaker 104 to press it inward inside the chassis 102 (shown in FIG. 10). The inward movement of the circuit breaker 104 causes the leading edge of the cluster shield 116 to make contact with the curtain 150 and apply the force F such that the curtain 150 moves with mount 152 towards the pedestal base 152, and towards the bus connectors 106 (shown in FIGS. 6, 7, and 11A). As the mount 152 glides along the cam profiles 136, the guide pins 157 move from one end to another end of the channels 159 at a distance Z (shown in FIGS. 7 and 9). The movement of the mount 152 causes the pedestal 130 to make contact with the left and right hands 156, 158 and force them outward to clear the apertures 151. In turn, the connector fingers 114 engage respective bus connectors 106 (shown in FIG. 13B). In the open position, the distance N1 between the connector fingers 114 and the bus connectors 106 has been minimized to distance N2 in accordance with the distance M1 between the front surface of the circuit breaker 104 and the front surface of the chassis 102 being minimized to distance M2 (shown in FIGS. 10-13B).

To move the shutter 111 from the open to the closed position, the steps above are reversed. When the circuit breaker 104 is pulled away from the chassis 102, the spring 164 (shown in FIG. 3) applies a return force to the curtain 150 to help the reverse movement of the moving components to cover access through the apertures 151. As a result, the left and right hands 156, 158 completely cover the apertures 151 (as shown in FIGS. 6 and 7).

One benefit of the shutter assembly 110 is that that each shutter 111 operates independently and is self contained. As such, each phase is independently protected and reduces the likelihood of inadvertent human contact with potentially exposed bus connectors 106. For example, if the three-phase circuit breaker 104 is replaced with a single-phase circuit breaker, two of the shutters 111 (e.g., shutters 111 for phase A and B) would automatically protect the unused bus connectors, while a third one of the shutters 111 (e.g., shutter 111 for phase C) would allow access for connecting the breaker to the bus bar. The self-containment aspect is also beneficial in reducing adverse effects of arc faults.

Another benefit of the shutter assembly 110 is that it increases mounting space inside the chassis 102 by eliminating support structures typically associated with phases of the switchgear system 100. The mounting space inside the chassis 102 is at a premium, being limited by numerous design requirements such as arc-flash and structural features. The shutter assembly 110 provides additional space for mounting additional switchgear components, including, for example, an arc barrier 170 (shown in FIGS. 11A, 11B). The arc barrier 170 is mounted to the back-mold 108 at a fixed end and extends therefrom with a free end overlapping the leading edge of the respective cluster shield 116 when the circuit breaker 104 is in the connected position. For example, an arc barrier 170 is added on either side of the outermost bus connectors 106 to block escape of arc exhaust when an arc fault occurs.

Figure 14:
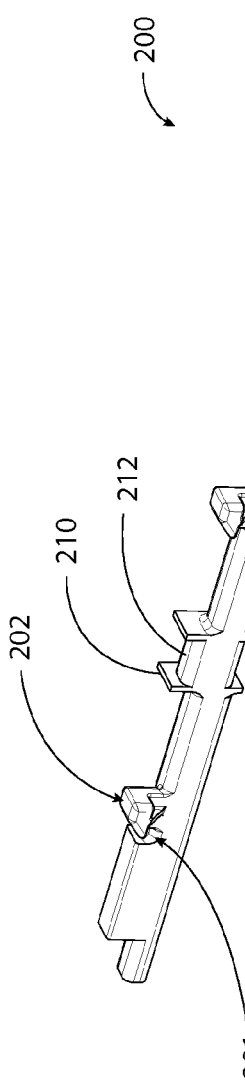
FIG. 14 is a perspective view of a crossbar for a shutter system.
Figure 15:
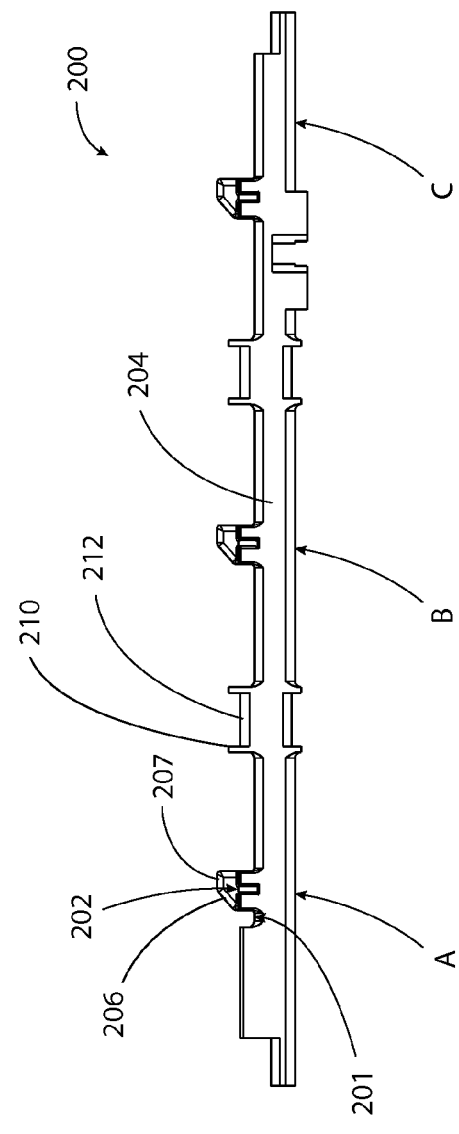
FIG. 15 is a front view of the crossbar of FIG. 14.
Figure 16:
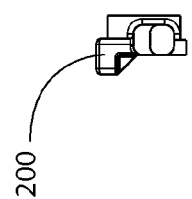
FIG. 16 is a side view of the crossbar of FIG. 14.

Referring to FIGS. 14-16, a crossbar 200 provides a locking feature for locking each shutter 111 of the shutter assembly 110 with a single input. The crossbar 200 is an elongated rod shaped to accommodate locking and unlocking of the shutters 111. The crossbar 200 includes a locking notch 201 and a plurality of lockouts 202. The notch 201 receives input via an activator 302 (described below in reference to FIGS. 23-26) to move between a locking and an unlocking position.

The lockouts 202 extend from a main body 204 and include a respective sloped surface 206 that functions as a gliding surface for a locking pin 208 (shown in FIGS. 17-22). The sloped surface 206 terminates in a flat surface 207 at a distal end of the lockout 202. Each lockout 202 is centrally located within a dedicated section of the main body 204 and corresponds to a respective shutter 111. The sections correspond to phases A-C (also shown in FIG. 2).

The crossbar 200 further includes dielectric barriers 210 separating each section A-C of the main body 204. The dielectric barriers 210 are positioned in pairs along the main body 204, with a bridge 212 in-between a respective pair. The dielectric barriers 210 are designed to isolate each pole of the circuit breaker 104 and stop cross-phasing during an interruption in electrical current.

Figures 17, 18:
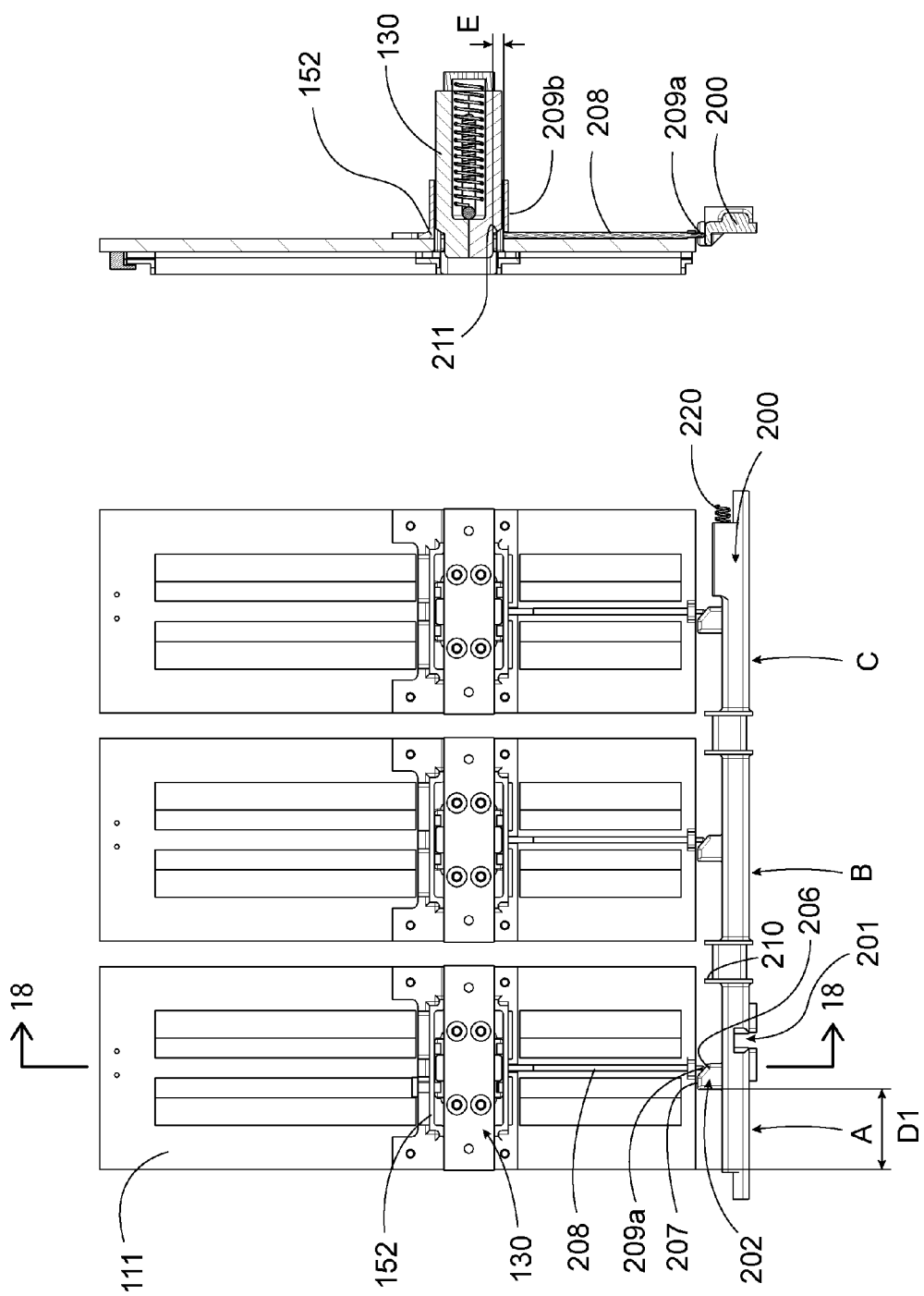
FIG. 17 is a front view of a shutter system with the crossbar of FIG. 14 in an unlocked state.
FIG. 18 is a cross-sectional view along lines 18-18 of FIG. 17.

Referring to FIGS. 17-22, locking and unlocking motions of the crossbar 200 function to simultaneously lock or unlock, in response to a single user input, all the shutters 111 for phases A-C. In FIGS. 17-19, the crossbar 200 is in an unlocked state. In this position the locking pin 208 is extended away from the pedestal 130. The locking pin 208 has a crossbar end 209a and a pedestal end 209b. In the unlocked state, the crossbar end 209a is in contact with the sloped surface 206 and the pedestal end 209b is at a distance E1 away from a pedestal shoulder 211. Additionally, the respective lockout 202 of phase A is at a distance D1 away from an external edge of the respective shutter 111.

A crossbar spring 220 is positioned at one end of the crossbar 200, in the phase A section. The crossbar spring 220 helps retain the unlocked state of the crossbar until a locking input is received.

Figure 21:
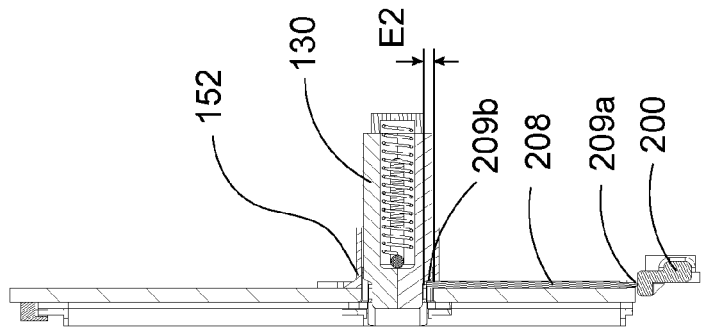
FIG. 21 is a cross-sectional view along lines 21-21 of FIG. 20.
Figure 20:
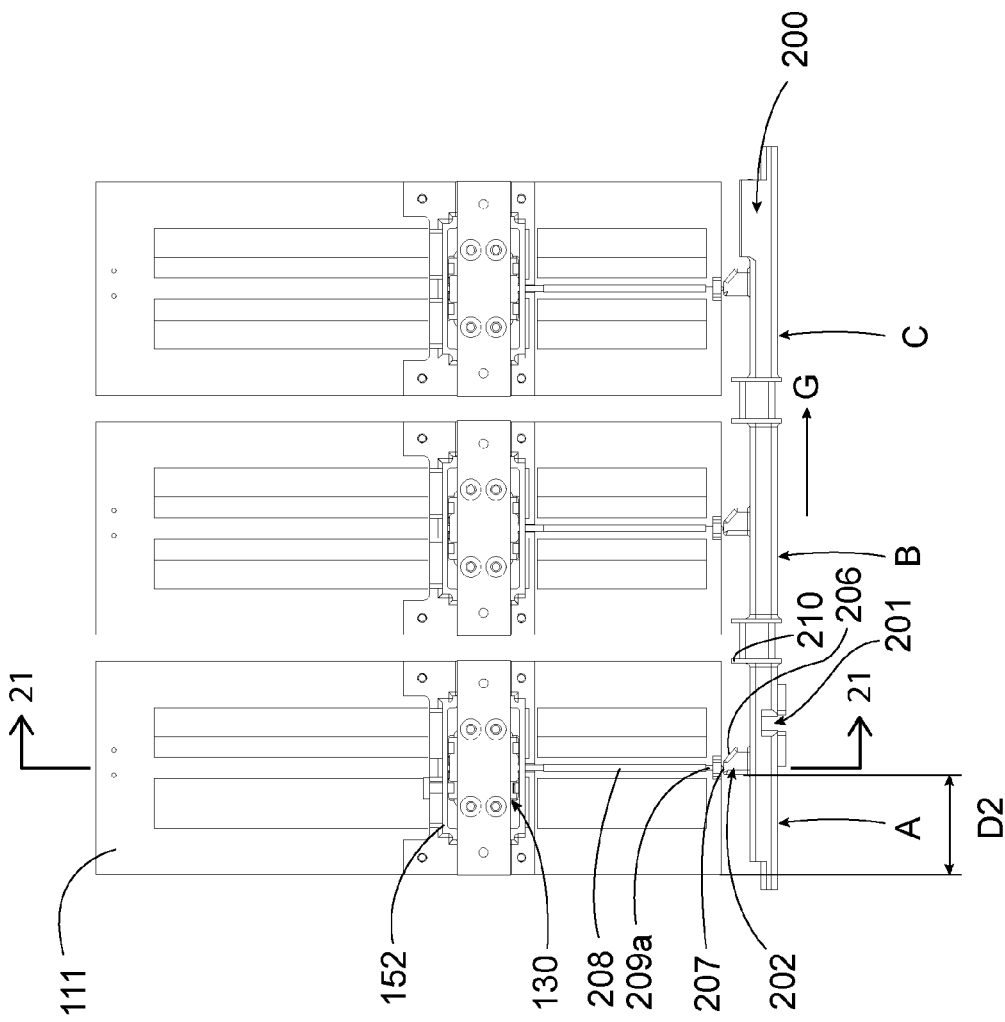
FIG. 20 is a front view of the shutter system of FIG. 17 with the crossbar in a locked state.
Figure 22:
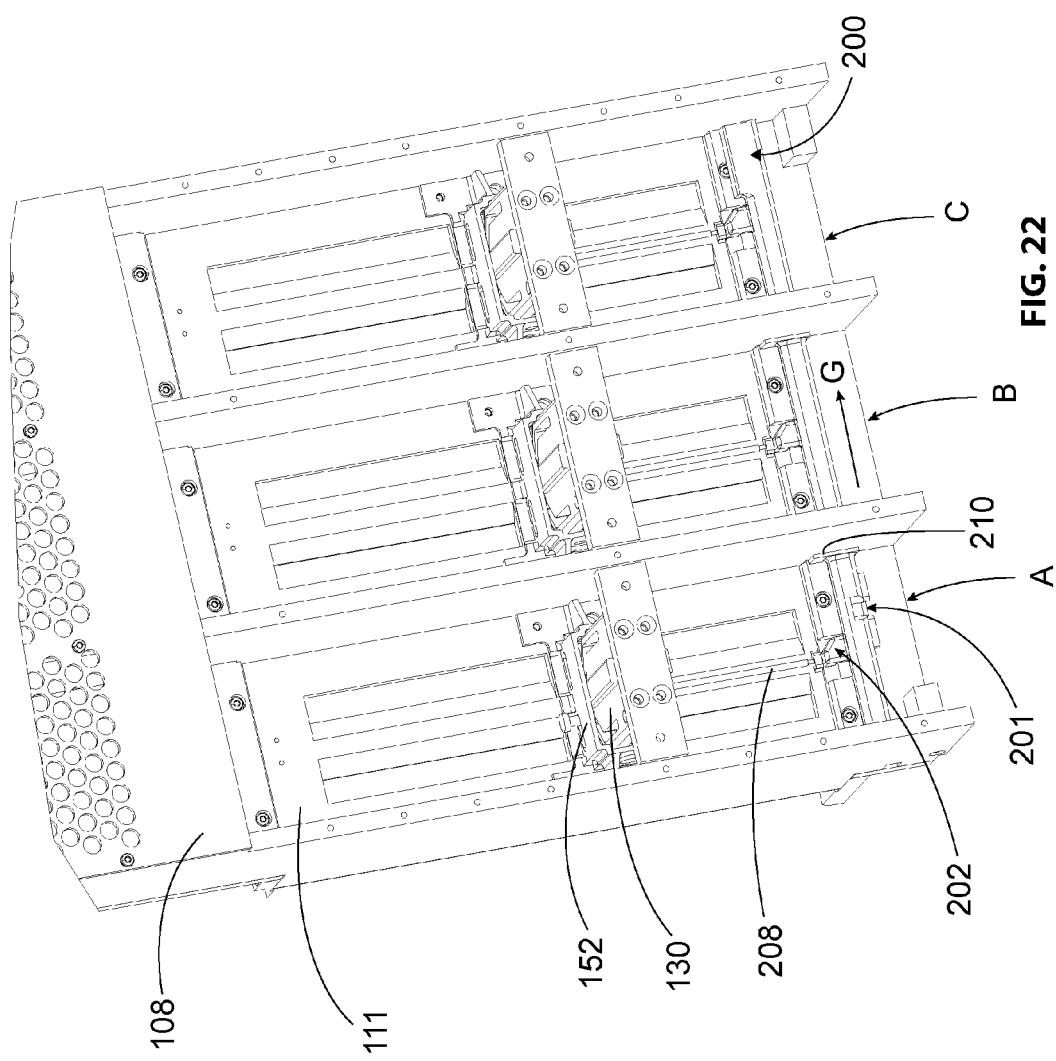
FIG. 22 is a back perspective view of the shutter system of FIG. 17 with the crossbar in the locked state.

In FIGS. 20-22, the crossbar 200 is in a locked state. Movement of the crossbar 200 in a direction G forces the crossbar end 209a of the locking pin 208 to glide along the sloped surface 206 until it rests on the flat surface 207. This movement of the locking pin 208 positions the pedestal end 209b within the area of the pedestal shoulder 211 to cause mechanical interference that locks movement between the mount 152 and the pedestal 130. The pedestal end 209b is inserted, for example, through a hole in the mount 152 (e.g., a hole between the channels 159 shown in FIG. 3). After the movement, the respective lockout 202 of phase A is at a greater distance D2 away from the external edge of the respective shutter 111, while the pedestal end 208b is now at a smaller distance E2 away from the pedestal shoulder 211. To unlock the shutters 111, the locking input is removed and the spring 220 forces the crossbar 200 in a reverse direction to the initial direction G.

The single movement of the crossbar 200 in direction G causes each lockout 202 to lock the respective shutter 111 for phases A-C. Thus, the single movement of the crossbar 200 locks all three shutters 111 simultaneously. As such, the crossbar 200 is beneficial at least because it simplifies the locking and unlocking of the shutters 111.

Figure 23:
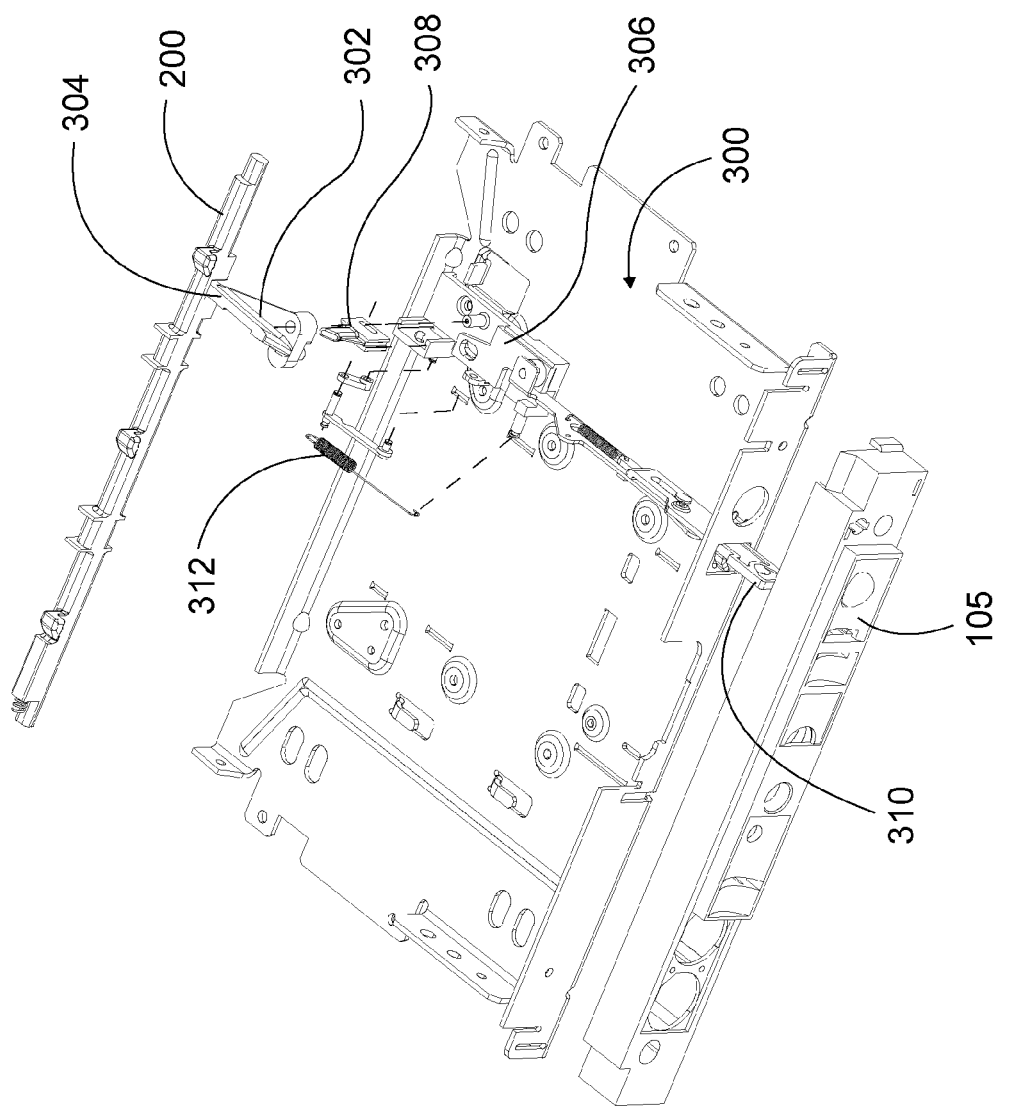
FIG. 23 is an exploded view of an interlock assembly.
Figure 24B:
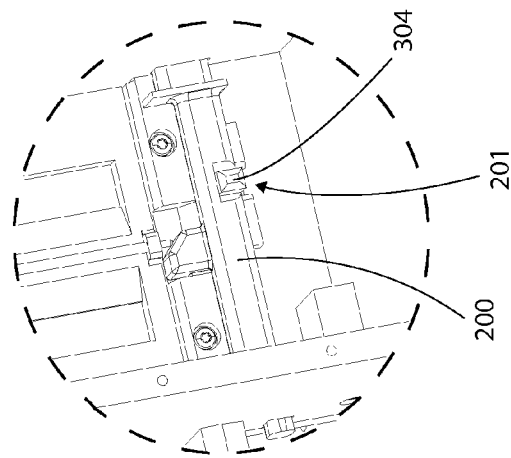
FIG. 24B is an enlarged portion of FIG. 24A.
Figure 24A:
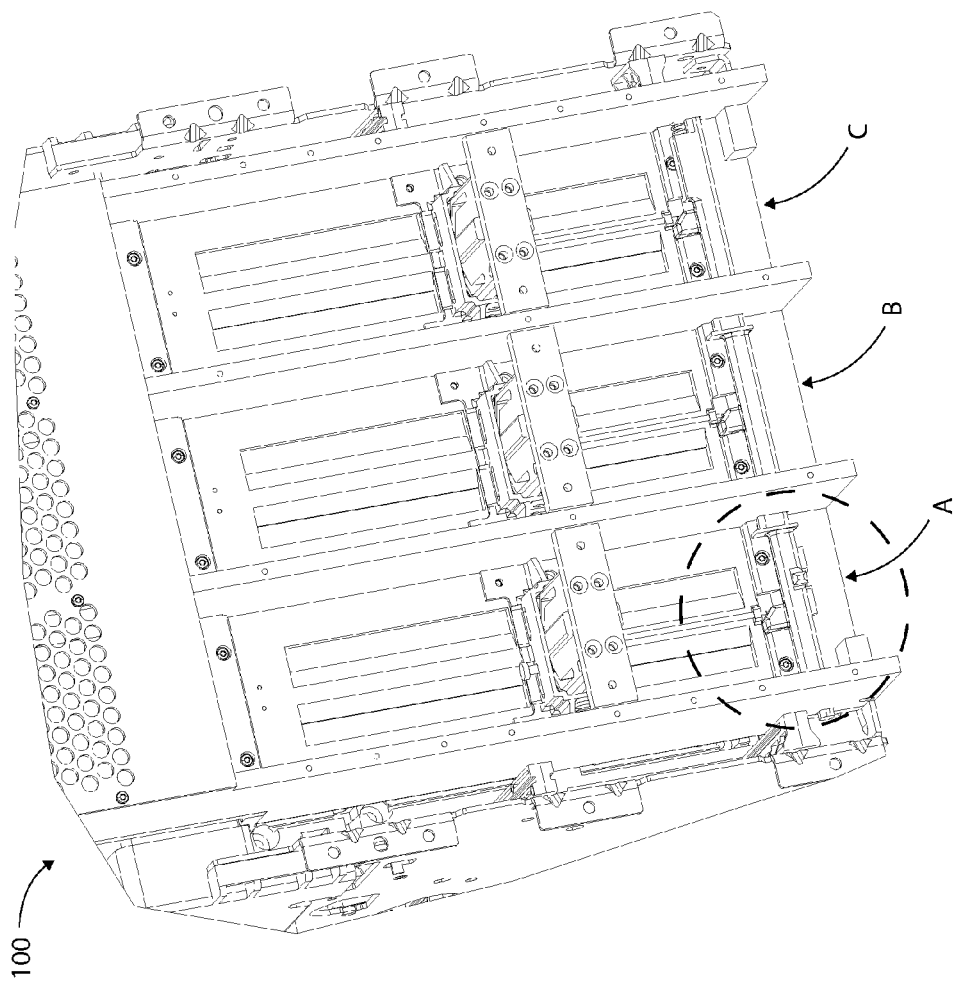
FIG. 24A is a partial back perspective view of the switchgear system of FIG. 1.

Referring to FIG. 23, an interlock assembly 300 shows an exemplary configuration for providing, via the activator 302, the input to move the crossbar 200 between the locked and unlocked state. The interlock assembly 300 includes the activator 302 with an arm 304 inserted within the locking notch 201 (shown in FIG. 15) of the crossbar 200. In FIGS. 24A and 24B, the arm 304 protrudes through the locking notch 201 in the section of phase A.

The interlock assembly 300 includes a bi-directional slide 306 that is coupled to a plunger 308 and an indicator 310. The plunger 308 acts as an input to indicate a respective breaker position, e.g., the connected or test positions. A plunger spring 312 is coupled to the plunger 308 and applies a return force when the circuit breaker 104 is at least partially disconnected (e.g., in the test position).

The indicator 310 is positioned near the front surface 105 of the chassis 102 and serves as a visual aide to indicate the respective breaker position. Specifically, the indicator 310 is coupled to the slide 306 and is accessible to a user from a front surface 105.

Figure 25:
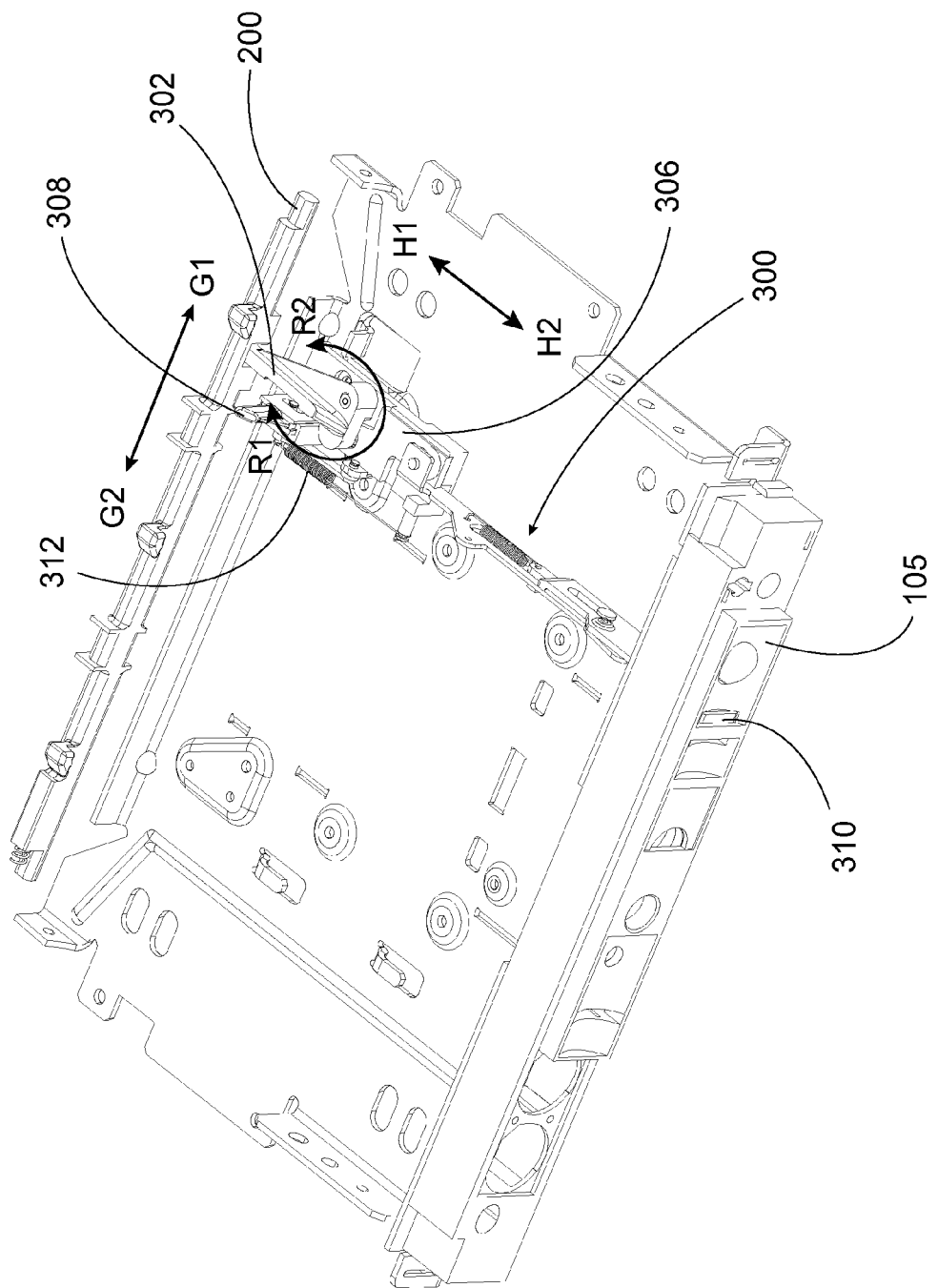
FIG. 25 is an assembled perspective view of the interlock assembly of FIG. 23 showing an unlocked state.
Figure 26:
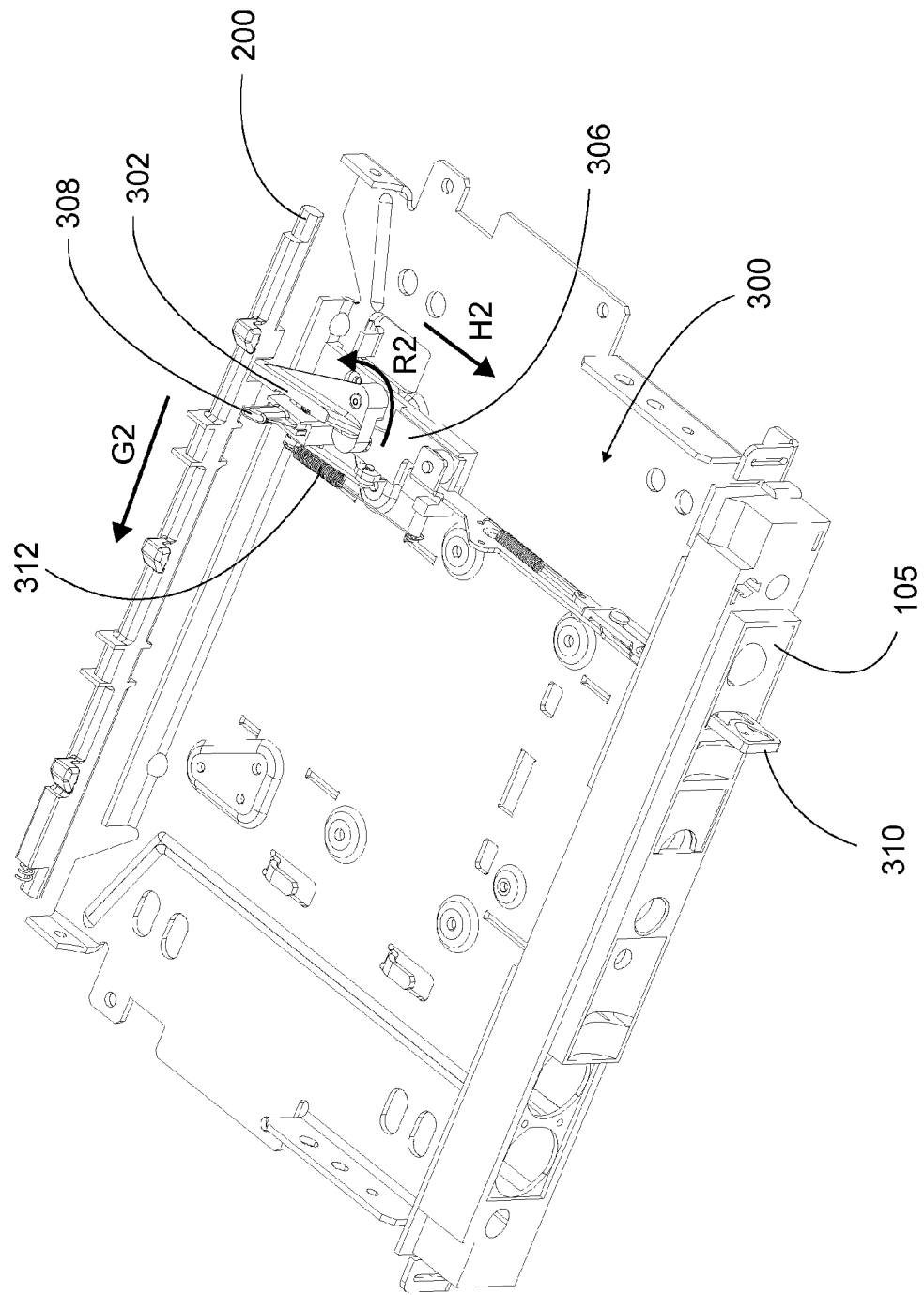
FIG. 26 an assembled perspective view of the interlock assembly of FIG. 23 showing a locked state.

Referring to FIGS. 25 and 26, movement of the interlock assembly 300 between the locked state and the unlocked state will be explained in more detail. In FIG. 25, the interlock assembly 300 is illustrated in the unlocked state and corresponds to the circuit breaker 104 being in the connected position. The bi-directional slide 306 is movable either in a direction H1 towards the crossbar 200 or in a direction H2 away from the crossbar 200. The movement of the slide 306 in direction H1 causes the activator 302 to pivot in a clockwise direction R1, while the movement of the slide 306 in direction H2 causes the activator 302 to pivot in a counterclockwise direction R2. In turn, the clockwise movement R1 causes the crossbar 200 to move in an unlocking direction G1, while the counterclockwise movement R2 causes the crossbar 200 to move in a locking direction G2.

In the unlocked state of the crossbar 200, the plunger 308 prevents a user from locking the shutters 111. Specifically, when the circuit breaker 104 is in its connected position, a rear edge of the circuit breaker 104 presses against the plunger 308 to cause forward movement H2 of the slide 306 towards the crossbar 200. In response, the activator 302 pivots clockwise in direction R1 to maintain the crossbar 200 in the unlocked state.

In FIG. 26, the interlock assembly 300 is illustrated in the locked state and corresponds to the circuit breaker 104 being in the test and/or disconnected position. Specifically, the indicator 310 has been pulled out of the recess in the front surface 105. In turn, the slide 306 has moved in direction H2 to cause pivoting of the activator 302 in direction R2, which moves the crossbar 200 in direction G2 to lock the shutters 111.

One benefit of the interlock assembly 300 is that it prevents a human operator from locking the shutters 111 when the circuit breaker is in the connected position. Specifically, when the circuit breaker 104 is in the connected position it presses the plunger 308 away from the front surface 105, which in turn causes the indicator 310 to be pulled back into the recess of the front surface 105 (as shown in FIG. 25). As a result, the human operator cannot pull the indicator 310 to lock the shutters 111.

Another benefit of the interlock assembly 300 is that it allows the human operator to lock the shutters 111 only when the circuit breaker is in the test and/or disconnected position. For example, when the circuit breaker 104 is in the test position it allows the return force of the plunger spring 312 to move the plunger 308 towards the front surface 105, which in turn causes the indicator 310 to extend from the recess of the front surface 105 (as shown in FIG. 26). As a result, the human operator can pull the indicator 310 to lock the shutters 111. Thus, the indicator 310 functions as user input and/or visual indicator indicative of a respective circuit breaker 104 position.

While particular embodiments, aspects, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A switchgear interlock system comprising:
   a circuit breaker with clusters of connector fingers, each of the clusters having a plurality of connector fingers enclosed in part within a cluster shield;
   a back-mold with attached bus connectors, the bus connectors being engaged with respective connector fingers when the circuit breaker is in a connected position, the bus connectors being disengaged from the respective connector fingers when the circuit breaker is in a test position; and
   a shutter assembly with independently movable shutters for covering access to the bus connectors in the test position and allowing access to the bus connectors in the connected position, each shutter of the movable shutters including
      a pedestal fixedly mounted to the back-mold,
      a mount mounted to the pedestal and being movable towards the back-mold in response to a force applied by a leading edge of the cluster shield when the circuit breaker is moved into the connected position, and
      a curtain mounted to the mount and being movable from a closed position to an open position in response to a force applied by the pedestal as the mount moves towards the back-mold, the closed position corresponding to the test position of the circuit breaker in which access is prevented to the bus connectors, the open position corresponding to the connected position of the circuit breaker in which access is allowed to the bus connectors.

2. The switchgear interlock system of claim 1, wherein each of the clusters includes connector fingers for a specific phase connection of the circuit breaker, the clusters including a first cluster for a first phase, a second cluster for a second phase, and a third cluster for a third phase.

3. The switchgear interlock system of claim 2, wherein the shutter assembly includes three independently movable shutters arranged to receive, respectively, connector fingers of the first cluster, the second cluster, and the third cluster.

4. The switchgear interlock system of claim 1, wherein the curtain includes a left hand and a right hand, the left hand moving in an opposite direction relative to the right hand in response to the force applied by the pedestal.

5. The switchgear interlock system of claim 4, wherein the left hand and the right hand return to the closed position in response to a spring force when the circuit breaker is moved from the connected position to the test position.

6. The switchgear interlock system of claim 5, wherein the spring force is applied by a return spring mounted within the pedestal and having a first end coupled to the curtain and a second end coupled to a base of the pedestal.

7. The switchgear interlock system of claim 1, wherein both the mount and the curtain are slidably movable.

8. The switchgear interlock system of claim 1, wherein the pedestal includes a cam profile along which the mount is slidably movable.

9. The switchgear interlock system of claim 1, further comprising an arc barrier mounted to the back-mold at a fixed end and extending therefrom with a free end being overlapping the leading edge of the cluster shield when the circuit breaker is in the connected position.

10. The switchgear interlock system of claim 1, further comprising a crossbar having a locked state in which movement of the curtain for all of the independently movable shutters is prevented.

11. The switchgear interlock system of claim 10, further comprising a visual indicator mechanically coupled to the crossbar, the visual indicator being positioned within a front recess in the unlocked state and extending outside the front recess in the locked state.

12. The switchgear interlock system of claim 11, further comprising an activator having an arm inserted in a notch of the crossbar, the activator being mechanically coupled to the visual indicator and pivoting between a clockwise direction and a counterclockwise direction in response to movement of the visual indicator, the clockwise direction causing the crossbar to move in an unlocking direction, the counterclockwise direction causing the crossbar to move in a locking direction.

13. A switchgear interlock system comprising:
a circuit breaker with a cluster shield extending rearwardly;
a back-mold with attached bus connectors;
at least two independently movable shutters mounted on the back-mold parallel to each other, each of the shutters including
a pedestal fixedly mounted to the back-mold,
a mount movably attached to the pedestal, and
a curtain attached to the mount and having two slidable hands movable between an open position and a closed position, the hands moving away from each other from the closed position to the open position in response to the mount being forced towards the back-mold along the pedestal, the hands moving towards each other from the open position to the closed position in response to a return force applied by a spring; and
a crossbar being movable between a locked state and an unlocked state in response to a single user input, the locked state preventing movement of the hands in the closed position for each of the shutters.

14. The switchgear interlock system of claim 13, wherein the spring is a compression spring mounted within a base of the pedestal.

15. The switchgear interlock system of claim 13, wherein the pedestal includes a cam profile along which the mount is slidably movable.

16. The switchgear interlock system of claim 13, further comprising an arc barrier mounted to the back-mold at a fixed end and extending therefrom with a free end overlapping a leading edge of the cluster shield when the hands are in the open position.

17. The switchgear interlock system of claim 13, further comprising a visual indicator mechanically coupled to the crossbar, the visual indicator being positioned within a front recess in the unlocked state and extending outside the front recess in the locked state.

18. The switchgear interlock system of claim 17, further comprising an activator having an arm inserted in a notch of the crossbar, the activator being mechanically coupled to the visual indicator and pivoting between a clockwise direction and a counterclockwise direction in response to movement of the visual indicator, the clockwise direction causing the crossbar to move in an unlocking direction, the counterclockwise direction causing the crossbar to move in a locking direction.

* * * * *